United States Patent
Huck et al.

(10) Patent No.: US 6,643,769 B1
(45) Date of Patent: Nov. 4, 2003

(54) SYSTEM AND METHOD FOR ENABLING SELECTIVE EXECUTION OF COMPUTER CODE

(75) Inventors: Jerome Huck, Palo Alto, CA (US); Carol L. Thompson, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 608 days.

(21) Appl. No.: 09/644,315

(22) Filed: Aug. 23, 2000

(51) Int. Cl.[7] .......................... G06F 9/32; G06F 11/36; G06F 9/44
(52) U.S. Cl. .................. 712/227; 712/239; 712/230; 714/35; 714/38; 717/124; 717/131
(58) Field of Search ................. 717/124, 125, 717/126, 127, 128, 129, 130, 131, 140, 141; 712/227, 239, 230, 236; 714/35, 38

(56) References Cited

U.S. PATENT DOCUMENTS

| | | | |
|---|---|---|---|
| 5,758,061 A | * 5/1998 | Plum | 717/130 |
| 5,956,758 A | 9/1999 | Henzinger et al. | 711/213 |
| 5,961,636 A | 10/1999 | Brooks et al. | 712/228 |
| 6,076,158 A | 6/2000 | Sites et al. | 712/230 |
| 6,108,773 A | 8/2000 | Col. et al. | 712/237 |
| 6,108,777 A | 8/2000 | Puziol et al. | 712/240 |
| 6,173,440 B1 | * 1/2001 | Darty | 717/131 |

OTHER PUBLICATIONS

U.S. patent application entitled "System and Method for Enabling Selective Execution of Computer Code," by Jerome Huck and Carol L. Thompson, filed Aug. 23, 2000, having Attorney Docket No. 10001221-1.

* cited by examiner

Primary Examiner—Daniel H. Pan

(57) ABSTRACT

The system of the present invention utilizes memory for storing a computer program and processing circuitry for executing instructions of the computer program. In particular, the computer program includes at least one branch instruction and a set of code that is to be selectively enabled or disabled. The branch instruction includes an address identifier identifying a memory address to which the processing circuitry may branch when executing the branch instruction. The processing circuitry, in executing the computer program, receives run time data indicative of whether the set of code is enabled or disabled, and based on the run time data, the processing circuitry sets a value of a mode indicator. While the program is running, the processing circuitry executes the branch instruction. In executing the branch instruction, the processing circuitry, depending on the value of the mode indicator, branches to the address identified by address identifier or branches to a different address. The set of code is located at one of the foregoing addresses. Thus, execution of the set of code is either enabled or disabled by controlling the value of the mode indicator.

12 Claims, 3 Drawing Sheets

SYSTEM AND METHOD FOR ENABLING SELECTIVE EXECUTION OF COMPUTER CODE

BACKGROUND OF THE INVENTION

1. Field of the Invention

The present invention generally relates to computer processing techniques and, in particular, to a system and method for enabling selective execution of certain code within a computer program without significantly affecting the execution performance of the program.

2. Related Art

In some computer applications, it is desirable to perform certain functionality only in a limited number of circumstances. For example, a computer program may include testing code that tests for certain conditions to ensure that the program is running correctly. As an example, the testing code may include one or more assertions, which are well known statements for testing computer programs. In this regard, assertions are inserted into a program being compiled, and when executed, an assertion tests for a certain condition. When the tested condition is true, the foregoing program is usually terminated, and an error message is displayed.

While it may be desirable to run this testing code during the debugging and/or testing phases, it may be less desirable to run this testing code in normal operation, since the testing code utilizes processor time. In this regard, execution of the testing code is not required for the computer program to operate correctly and is only useful if there is an error that can be detected by the testing code. Thus, executing the testing code when the computer program runs free of errors needlessly utilizes processor time.

As a result, most computer programs that include testing code are usually recompiled once the testing and debugging phases are complete. During recompilation, insertion of testing code into the recompiled programs is prevented such that the recompiled programs do not include the testing code. The recompiled programs run more efficiently since there is no testing code to execute, and it is these recompiled programs that are usually sold to and used by consumers.

However, even after the testing and debugging phases have been completed, there may still be some bugs in the computer program that could be detected by the removed testing code, and once the testing code has been removed, the computer program lacks the capability of detecting these bugs. Therefore, a tradeoff exists between leaving testing code in a computer program and removing the testing code from the computer program. In this regard, the testing code may be removed from the computer program to improve the performance of the program, or the testing code may be left in the program to test for certain errors, thereby adversely affecting the program's performance.

Thus, a heretofore unaddressed need exists in the industry for providing a system and method of enabling selective execution of certain code (e.g., testing code) within a computer program based on inputs at run time with minimal or no affect to the program's performance when execution of the foregoing code is not desired.

SUMMARY OF THE INVENTION

The present invention overcomes the inadequacies and deficiencies of the prior art as discussed hereinbefore. Generally, the present invention provides a system and method for selectively executing sets of code in computer programs.

The system of the present invention utilizes memory for storing a computer program and processing circuitry for executing instructions of the computer program. In particular, the computer program includes at least one branch instruction and a set of code that is to be selectively enabled or disabled. The branch instruction includes an address identifier identifying a memory address to which the processing circuitry may branch when executing the branch instruction. The processing circuitry, in executing the computer program, receives run time data indicative of whether the set of code is enabled or disabled, and based on the run time data, the processing circuitry sets a value of a mode indicator. While the program is running, the processing circuitry executes the branch instruction. In executing the branch instruction, the processing circuitry, depending on the value of the mode indicator, branches to the address identified by address identifier or branches to a different address. The set of code is located at one of the foregoing addresses. Thus, execution of the set of code is either enabled or disabled by controlling the value of the mode indicator.

The present invention can also be viewed as providing a method for selectively executing sets of code in computer programs. The method can be broadly conceptualized by the following steps: storing a computer program in memory, the computer program having a set of code and a branch instruction, the branch instruction including an address identifier identifying a first address in the memory; receiving, during a run of the program, run time data indicating whether the set of code is enabled; setting a value of a mode indicator based on the run time data; identifying a second address in the memory in response to the branch instruction; branching to the second address based on said identifying step and said value of said mode indicator; and executing an instruction at the second address in response to the branching step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

In general, the present invention relates to a system and method for enabling selective execution of certain code (e.g., testing code) in a computer program with minimal impact to the execution performance of the program. In fact, when the foregoing code is disabled, the execution performance of the computer program should be the same or at least comparable to the execution of a similar program that does not include the disabled code. In this regard, the presence of the disabled code in the executed program should not adversely affect the performance of the program.

Figure 1:
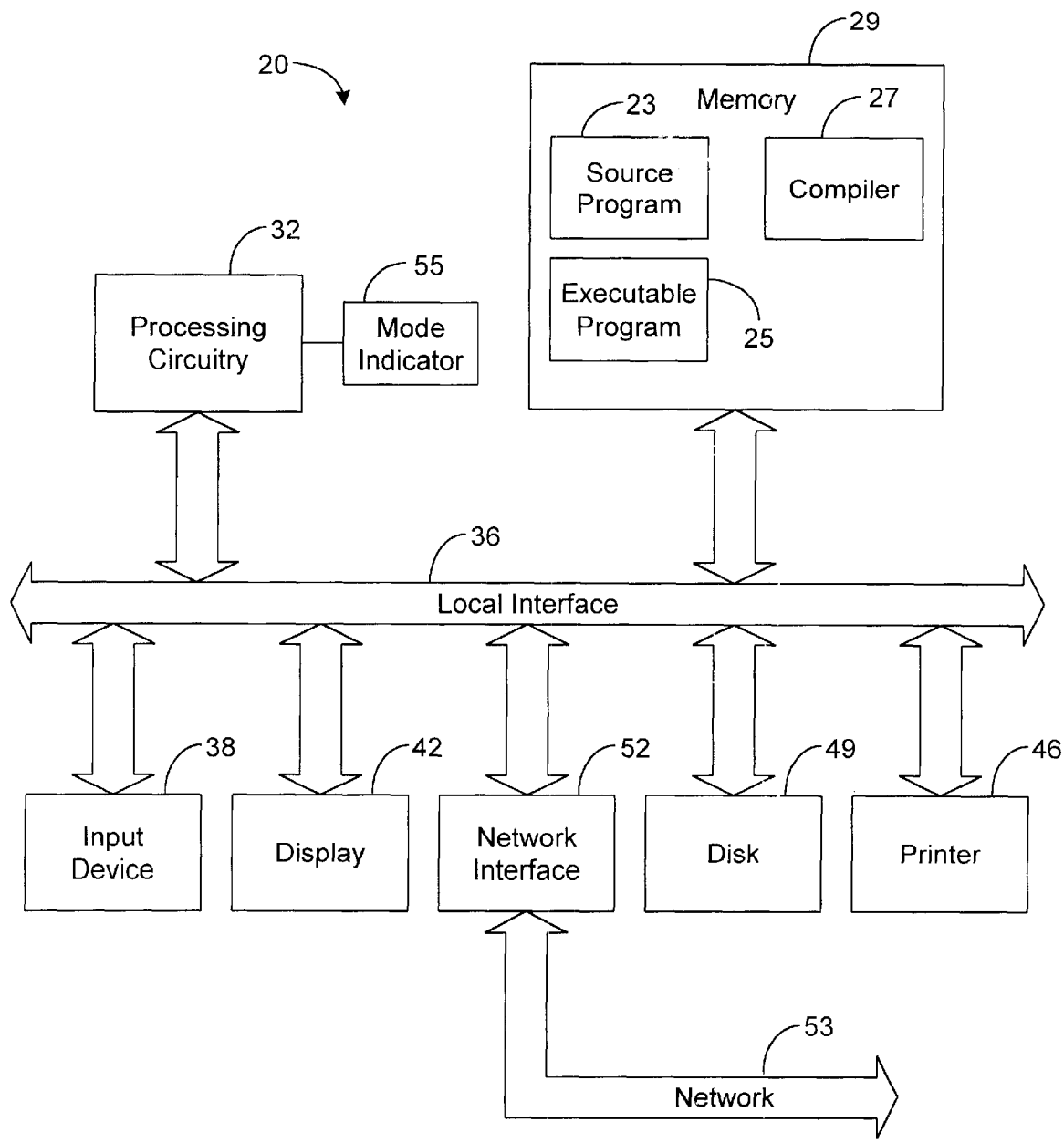
FIG. 1 is a block diagram illustrating a computer system in accordance with the present invention.

FIG. 1 depicts a computer system 20 designed to implement the present invention. As shown by FIG. 1, the computer system 20 may include a source program 23, an executable program 25, and a compiler 27 stored in memory 29. The executable program 25 may be generated by the compiler 27, which is configured to translate the source program 23 into a form compatible with processing circuitry 32. In this regard, the compiler 27 translates the source program 23 into the executable program 25, which may then be executed by processing circuitry 32. However, it should be noted that the compiling of the source program 23 into the executable program 25 does not form a material part of the present invention, and it is not necessary for the executable program 25 to have been compiled by any compiler.

Note that the source program 23, the executable program 25, and/or the compiler 27, when the compiler 27 is implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the source program 23, the executable program 25, and/or the compiler 27 may be magnetically stored and transported on a conventional portable computer diskette.

The processing circuitry 32 may be a digital processor or other type of circuitry configured to run the executable program 25 by processing and executing the instructions of the executable program 25. The processing circuitry 32 communicates to and drives the other elements within the system 20 via a local interface 36, which can include one or more buses. Furthermore, an input device 38, for example, a keyboard, a switch, a mouse, and/or other type of interface, can be used to input data from a user of the system 20, and screen display 42 or a printer 46 can be used to output data to the user. A disk storage mechanism 49 can be connected to the local interface 36 to transfer data to and from a nonvolatile disk (e.g., magnetic, optical, etc.). The system 20 can be connected to a network interface 52 that allows the system 20 to exchange data with a network 53.

Each instruction in the executable program 25 is stored at an address in memory 29. Furthermore, a branch instruction includes an address identifier that identifies an address in memory 29. Normally, in executing the branch instruction, a conventional processor branches to the address identified by the address identifier in the branch instruction. The processor then executes the instruction at the identified address. This process of branching to an instruction at an address identified by an executing branch instruction is well known in the art.

In the present invention, certain code is either enabled or disabled at run time based on run time data. For illustrative purposes, it will be assumed that the foregoing code defines assertion tests, and this code will be referred to hereafter as "testing code." However, it should be noted that the foregoing code can perform other functionality in addition to or in lieu of assertion testing, and the present invention may be utilized to selectively enable or disable any type of code at run time based on a run time input. As an example, the present invention may be utilized to selectively enable or disable the taking of measurements by a device capable of performing such measurements.

The processing circuitry 32 (FIG. 1) preferably has access to a mode indicator 55, such as a flag in a control register, for example, that indicates whether the testing code is enabled or disabled. This indicator 55 preferably includes a value that is controlled (e.g., asserted or deasserted) based on run time data, such as an input from input device 38 or other source. The run time data is indicative of whether or not the testing code is to be enabled or disabled. In response to the run time data, the processing circuitry 32 updates the mode indicator 55. In this regard, if the run time data indicates that the testing code is to be enabled, then the processing circuitry 32 preferably asserts the value of the mode indicator 55. However, if the run time data indicates that the testing code 65 is to be disabled, then the processing circuitry 32 preferably deasserts the value of the mode indicator 55.

Once the mode indicator 55 has been set, the value of the mode indicator 55 is preferably maintained (e.g, unaltered) through the execution of the program 25. It should be noted that "setting" the mode indicator 55 in its general sense means modifying, if necessary, the value of the mode indicator 55 such that the value of the mode indicator 55 properly indicates whether or not the testing code is enabled. Therefore, "setting" the mode indicator 55 could include asserting and/or deasserting one or more bits of the mode indicator 55, when the mode indicator 55 is represented as a bit value.

Although the status of the mode indicator 55 may be based on an input from the input device 38, as described above, the status of the mode indicator 55 can be controlled via an input or another type of data from another source in another embodiment. For example, the run time data may be interfaced with the system 20 via network interface 52. Alternatively, run time data may be produced via the execution of an instruction in the executable program 25 or in another program (not shown) that is executed by the processing circuitry 32. In particular, the run time data may be passed to the executable program 25 from another program (not shown) that calls the executable program 25. The techniques used to control the status of the mode indicator 55 are not important in implementing the present invention, and various methodologies may be used to set the value of the mode indicator 55 without departing from the principles of the present invention.

When the mode indicator 55 is deasserted and the testing code 65 is therefore disabled, the processing circuitry 32 is configured to execute each branch instruction according to the aforementioned conventional techniques. In other words, the processing circuitry 32, when executing a branch instruction, is designed to branch to the address identified by an address identifier included in the branch instruction. However, when the mode indicator 55 is asserted and the testing code is therefore enabled, the processing circuitry 32 is configured to execute at least one type of branch instruction differently, as will be described in further detail hereinafter.

In this regard, different types of instructions are represented by different encoding. As used herein, the "encoding" of an instruction is the set of characters (e.g., alphabetical, numerical, etc.) or, in other words, the expression used to represent the instruction. When the processing circuitry 32 executes at least one particular type of branch instruction when the testing code is enabled, the processing circuitry 32 is configured to identify the address identifier included in the branch instruction. This address identifier identifies the address that would have been branched to had the testing code been disabled. The processing circuitry 32 is then designed to compute or otherwise identify a new address based on the foregoing address identifier and to branch to this new address. An instruction of the enabled testing code should be stored at the new address such that, by branching to the new address, the processing circuitry 32 should execute at least one of the instructions of the enabled testing code.

After executing the aforementioned instruction of the enabled testing code and perhaps other instructions of the enabled testing code, the processing circuitry 32 then should execute the instruction at the address identified by the address identifier in the previously executed branch instruction. In other words, the processing circuitry 32 should execute the instruction, referred to hereafter as "the normal target," that would have been branched to in executing the foregoing branch instruction had the testing code been disabled. There are various methodologies that may be employed to perform this functionality.

For example, when the testing code is enabled, the processing circuitry 32 may branch to a particular set of testing code in executing the branch instruction. This set of testing code may be located in memory 29 such that the last instruction of the set of testing code is next to or, in other words, contiguous with the normal target (i.e., the instruction identified by the address identifier of the branch instruction). Therefore, after executing the last instruction of the foregoing set of testing code, the processing circuitry 32 executes the normal target by virtue of the normal target's location relative to the last instruction of the testing code. The processing circuitry 32 then resumes execution of the executable program 25 from the normal target.

Figure 2:
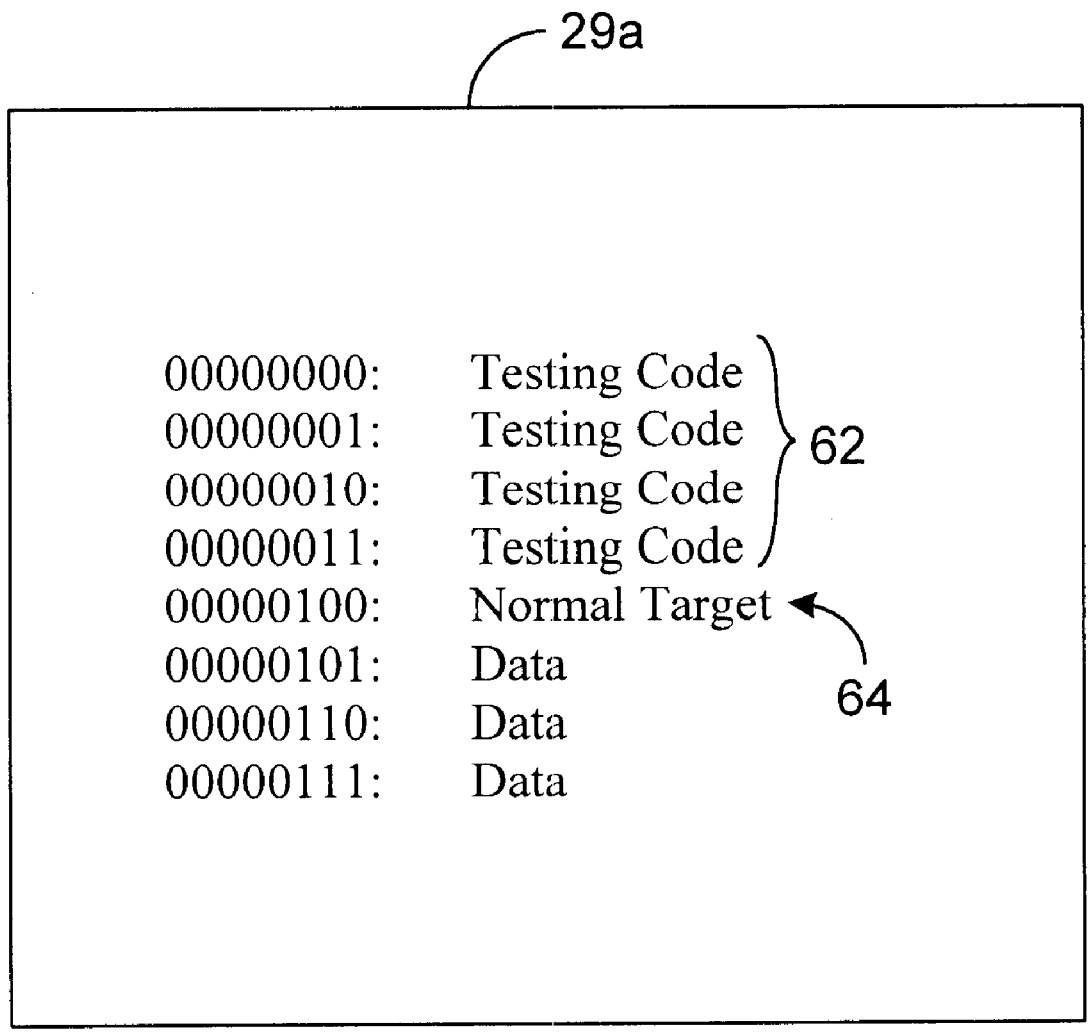
FIG. 2 is a block diagram illustrating an exemplary view of a portion of an executable program depicted in FIG. 1.

To better illustrate the foregoing example, refer to FIG. 2, which depicts an exemplary block of contiguous memory 29a. The memory 29a shown by FIG. 2 may include eight memory locations identified by addresses 00000000 through 00000111, respectively. The first four memory addresses (i.e., addresses 00000000 through 00000011) include data defining a set of testing code 62 in the executable program 25. In particular, the first four memory addresses include data defining testing instructions that are selectively enabled based on the mode indicator 55. The next memory address (i.e., address 00000100) includes data defining the aforementioned normal target 64 of the executable program 25, and the remaining memory addresses (i.e., addresses 00000101 through 00000111) include other data, such as other instructions of the executable program 25.

In the foregoing example, one of the branch instructions of the executable program 25 includes an address identifier that identifies the address of the normal target. When the set of testing code 62 is disabled and the mode indicator 55 is therefore deasserted, the processing circuitry 32, in executing the branch instruction, is configured to branch to the normal target 64 or, in other words, to branch to the address identified by the address identifier included in the branch instruction. However, when the set of testing code 62 is enabled and the mode indicator 55 is therefore asserted, the processing circuitry 32, in executing the branch instruction, is configured to branched to address 000000000 instead. Therefore, the processing circuitry 32 branches to and executes the set of testing code 62 stored at memory locations 00000000 through 00000011 before executing the normal target 64.

To branch to address 000000000, as described above, the processing circuitry 32 may simply flip the third least significant bit of the address identified by the address identifier of the branch instruction. Such a flipping operation may be performed quickly without significantly delaying the execution of the branch instruction. By performing this operation for each executed branch instruction of a particular type or of a set of particular types, the selective execution of the entire testing code within the program 25 may be enabled.

In this regard, the first testing instruction of each set of testing code 62 that is to be executed when the testing code is enabled could be stored at a memory location that is four locations from a normal target 64, as shown by FIG. 2. Then the aforementioned techniques could be used each time a branch instruction of a particular type or a particular set of types is executed, such that different sets of testing code 62 are executed in response to different branch instructions. As a result, different sets of testing code 62 can be executed as the program 25 runs.

It should be noted that the operation of flipping the third least significant bit of the address of the normal target is described for illustrative purposes only. In particular, the set of testing code 62 may be located at other memory locations relative to the normal target 64 such that other bits of the normal target address may be flipped in the flipping operation or such that other techniques for computing the proper address may be employed. For example, the proper address may be computed via an arithmetic operation (e.g., addition, subtraction, etc.) based on the address identifier in the branch instruction and/or based on other data.

It should be further noted that it is not necessary for the normal target 64 to be contiguous in memory with the set of testing code 62. For example, the set of testing code 62 branched to by the processing circuitry 32 in lieu of the normal target 64 may include a branch instruction that causes the processing circuitry 32 to branch to the normal target 62. However, such an embodiment may undesirably complicate and/or lengthen the computation of the address of the set of testing code 62.

It should also be noted that the present invention has been described herein as branching to an address identified by the address identifier of an executing branch instruction unless the testing code is enabled. However, it may be possible to encode the branch instructions such that the address identifier in a branch instruction identifies testing code. In this embodiment, the processing circuitry 32 is configured to branch to the address identified by the address identifier when the testing code is enabled. When the testing code is disabled, the processing circuitry 32 can be configured via techniques similar to those disclosed herein to compute a new address for branching in order to prevent execution of the testing code.

For example, the processing circuitry 32 may execute a branch instruction that identifies address 00000000 in FIG. 2. When the testing code is enabled and the value of the mode indicator 55 is therefore asserted, the processing circuitry 32 may be configured to branch to address 00000000 in executing the foregoing branch instruction. Therefore, when the testing code is enabled, the processing circuitry 32 executes the set of testing code 62 before executing the normal target 64.

However, when the testing code is disabled and the value of the mode indicator 55 is therefore deasserted, the processing circuitry 32 may be configured to compute address 00000100 by flipping the third least significant bit of the address identified by the address identifier. Therefore, when the testing code is disabled, the processing circuitry 32 branches to the normal target 64 without executing the set of testing code 62. Thus, the same instructions are executed as in the preferred embodiment even though the processing circuitry 32 is configured differently.

Furthermore, in another embodiment, it is possible to include more than one address identifier in the branch instruction. One address identifier identifies the address of the normal target 64, and another address identifier identifies the address of the set of testing code 62. The processing circuitry 32 then branches to one of the foregoing addresses based on the value of the mode indicator 55. In particular, when the testing code is disabled, the processing circuitry 32 selects, for the branching operation, the address identifier identifying the address of the normal target 64. Therefore, the processing circuitry 32 branches to the normal target 64 without executing the testing code 62. However, when the testing code is enabled, the processing circuitry 32 selects, for the branching operation, the address identifier identifying the address of the set of testing code 62. Therefore, the processing circuitry 32 branches to and executes the set of testing code 62 before executing the normal target 64.

There are various other methodologies and modifications that may be employed to provide the processing circuitry 32 with the correct address to branch to when the processing circuitry 32 is executing the branch instruction.

OPERATION

The preferred use and operation of the system 20 and associated methodology are described hereafter.

In the operation described hereafter, assume that the processing circuitry 32, in executing a branch instruction of a particular type, is configured to branch to the address identified by an address identifier of the branch instruction, unless the value of the mode indicator 55 is asserted. If the value of the mode indicator 55 is asserted, then the processing circuitry 32 is instead configured to compute a new address for branching, according to the techniques described hereinbefore. In this regard, although other techniques may be used to compute or otherwise determine a new address, the processing circuitry 32, in computing the new address, flips the third least significant bit of the address identified by the address identifier. Further, assume that each branch instruction described hereafter is of the type that is to be executed according to the techniques described herein.

Figure 3:
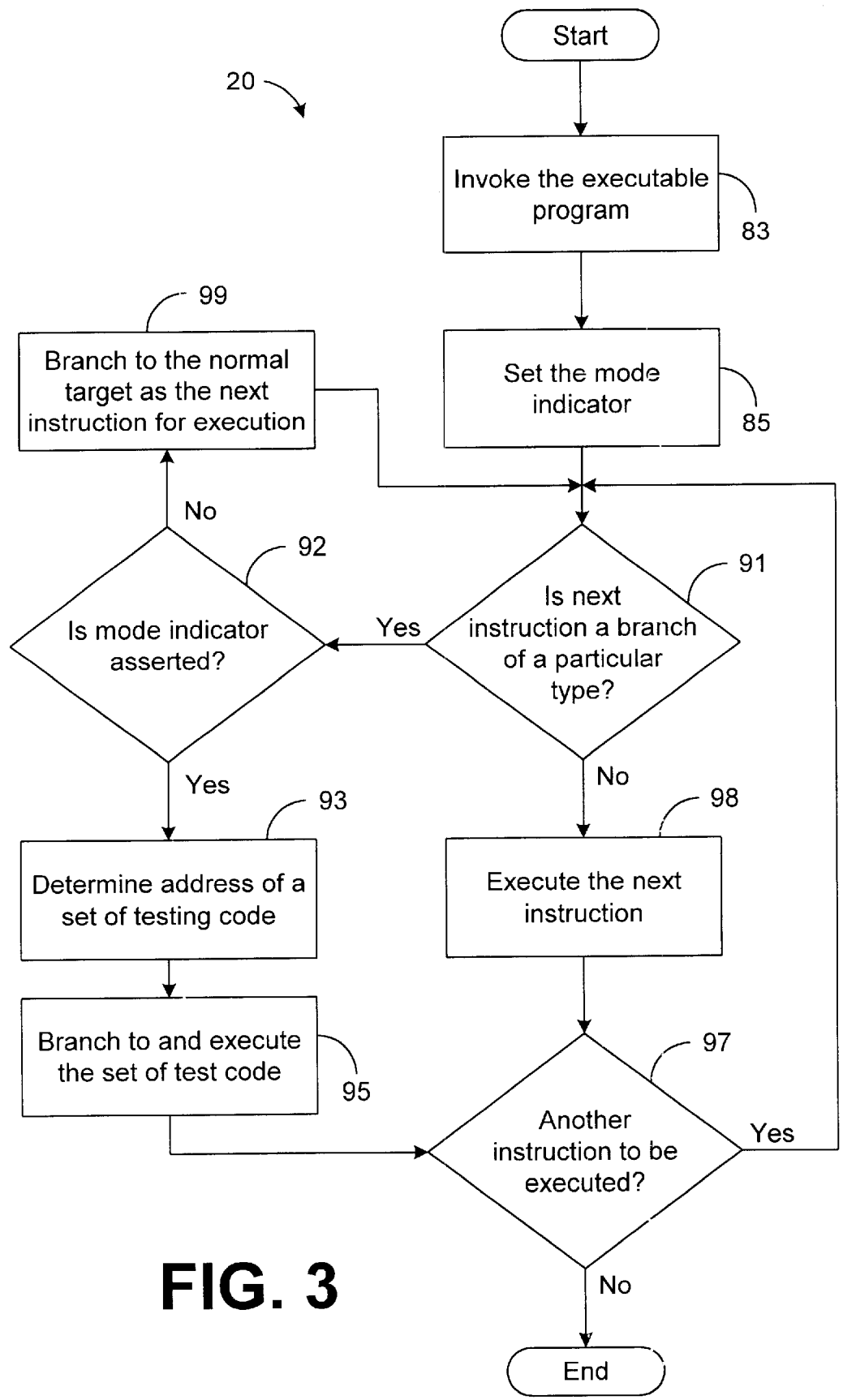
FIG. 3 is a flow chart illustrating the architecture and functionality of the computer system of FIG. 1 in executing the executable program depicted in FIG. 1.

Assume that a user, via input device 38, enters an input that invokes the executable program 25, as shown by block 83 of FIG. 3. In response, instructions from executable program 25 are transmitted to processing circuitry 32 for execution. These instructions preferably include a branch instruction that includes an address identifier identifying the address of the normal target 62.

To select the mode of operation, the user may enter another input via input device 38 indicating whether or not the user wishes to enable the testing code. In a first mode of operation, assume that the user enters an input indicating that the testing code is to be enabled. In response, the processing circuitry 32 asserts the value of the mode indicator 55 in block 85 of FIG. 3. Therefore, when the branch instruction is executed, the processing circuitry 32 computes a new address based on the address identified by the address identifier included in the branch instruction, as shown by blocks 91–93. This new address preferably identifies the address of the set of testing code 62. The processing circuitry 32 then executes the testing code 62 in block 95 of FIG. 3. After the set of testing code 62 is executed, the processing circuitry 32 executes the normal target 64 and thereafter continues with normal execution of instructions, as shown by blocks 97, 91 and 98. Note that the normal target 64 should be the "next" instruction for execution after block 95. Thus, in the first mode of operation, execution of the branch instruction causes the execution of the set of testing code 62.

In a second mode of operation, assume that the user enters an input indicating that the testing code is to be disabled instead of enabled. In response to such an input, the processing circuitry 32 deasserts the value of the mode indicator 55 in block 85 of FIG. 3. Therefore, when the branch instruction is executed, the processing circuitry 32 branches to the address identified by the address identifier included in the branch instruction, as depicted by blocks 91, 92, and 99 of FIG. 3. In other words, the processing circuitry 32 branches to the normal target 64 without executing the set of testing code 62. Thereafter, the processing circuitry 32 continues with normal execution of instructions, as shown by blocks 91, 98 and 97. Thus, in the second mode of operation, the set of testing code 62 is not executed.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A computer system for enabling selective execution of sets of code in computer programs, comprising:

memory for storing a computer program, said computer program having a set of code and a branch instruction; and processing circuitry configured to receive run time data indicating whether said set of code is enabled and to set a value of a mode indicator based on said run time data, said processing circuitry configured to receive and execute said branch instruction during a run of said computer program, said processing circuitry configured to branch to a first address of said memory, in response to said branch instruction and based on said value of said mode indicator, when said set of code is enabled, said processing circuitry further configured to branch to a second address of said memory, in response to said branch instruction and based on said value of said mode indicator, when said set of code is disabled, wherein said branch instruction includes a first address identifier and a second address identifier, said first address identifier identifying said first address and said second address identifier identifying said second address, and wherein said processing circuitry is further configured to select one of said address identifiers based on said value of said mode indicator in response to said branch instruction.

2. The system of claim 1, wherein said set of code, when executed by said processing circuitry, tests for errors that occur during said run of said program.

3. The system of claim 1, wherein said processing circuitry is further configured to maintain said value of said mode indicator during said run of said computer program and until termination of said run.

4. The system of claim 1, wherein said processing circuitry executes said set of code when said processing circuitry branches to said first address, and wherein said processing circuitry executes an instruction at said second address upon completing execution of said set of code.

5. A computer system for enabling selective execution of sets of code in computer programs, comprising:

memory for storing a computer program, said computer program having a set of code and a branch instruction; and processing circuitry configured to receive run time data indicating whether said set of code is enabled and to set a value of a mode indicator based on said run time data, said processing circuitry configured to receive and execute said branch instruction during a run of said computer program, said processing circuitry configured to branch to a first address of said memory, in response to said branch instruction and based on said value of said mode indicator, when said set of code is enabled, said processing circuitry further configured to branch to a second address of said memory, in response to said branch instruction and based on said value of said mode indicator, when said set of code is disabled, wherein said branch instruction includes an address identifier that identifies said first address, wherein an instruction of said set of code is stored in said memory at said first address, and wherein said processing circuitry, in executing said branch instruction, is configured to identify said second address based on said first address when said set of code is disabled.

6. A computer system for enabling selective execution of sets of code in computer programs, comprising:

memory for storing a computer program, said computer program having a set of code and a branch instruction; and processing circuitry configured to receive run time data indicating whether said set of code is enabled and to set a value of a mode indicator based on said run time data, said processing circuitry configured to receive and execute said branch instruction during a run of said computer program, said processing circuitry configured to branch to a first address of said memory, in response to said branch instruction and based on said value of said mode indicator, when said set of code is enabled, said processing circuitry further configured to branch to a second address of said memory, in response to said branch instruction and based on said value of said mode indicator, when said set of code is disabled, wherein said branch instruction includes an address identifier that identifies said first address, wherein an instruction of said set of code is stored in said memory at said first address, and wherein said processing circuitry, in executing said branch instruction, is configured to flip a bit of said first address when said set of code is disabled.

7. A computer system for enabling selective execution of sets of code in computer programs, comprising:

memory for storing a computer program, said computer program having a set of code and a branch instruction; and processing circuitry configured to receive run time data indicating whether said set of code is enabled and to set a value of a mode indicator based on said run time data, said processing circuitry configured to receive and execute said branch instruction during a run of said computer program, said processing circuitry configured to branch to a first address of said memory, in response to said branch instruction and based on said value of said mode indicator, when said set of code is enabled, said processing circuitry further configured to branch to a second address of said memory, in response to said branch instruction and based on said value of said mode indicator, when said set of code is disabled, wherein said branch instruction includes an address identifier that identifies said second address, wherein an instruction of said set of code is stored in said memory at said first address, and wherein said processing circuitry, in executing said branch instruction, is configured to identify said first address based on said second address when said set of code is enabled.

8. A computer system for enabling selective execution of sets of code in computer programs, comprising:

memory for storing a computer program, said computer program having a set of code and a branch instruction; and processing circuitry configured to receive run time data indicating whether said set of code is enabled and to set a value of a mode indicator based on said run time data, said processing circuitry configured to receive and execute said branch instruction during a run of said computer program, said processing circuitry configured to branch to a first address of said memory, in response to said branch instruction and based on said value of said mode indicator, when said set of code is enabled, said processing circuitry further configured to branch to a second address of said memory, in response to said branch instruction and based on said value of said mode indicator, when said set of code is disabled, wherein said branch instruction includes an address identifier that identifies said second address, wherein an instruction of said set of code is stored in said memory at said first address, and wherein said processing circuitry, in executing said branch instruction, is configured to flip a bit of said second address when said set of code is enabled.

9. A computer system for enabling selective execution of sets of code in computer programs, comprising:

memory for storing a computer program, said computer program having a set of code and a branch instruction; and processing circuitry configured to receive run time data indicating whether said set of code is enabled and to set a value of a mode indicator based on said run time data, said processing circuitry configured to receive and execute said branch instruction during a run of said computer program, said processing circuitry configured to branch to a first address of said memory, in response to said branch instruction and based on said value of said mode indicator, when said set of code is enabled, said processing circuitry further configured to branch to a second address of said memory, in response to said branch instruction and based on said value of said mode indicator, when said set of code is disabled, wherein said branch instruction includes an address identifier identifying one of said addresses, wherein said branch instruction is encoded with an expression, and wherein said processing circuitry is further configured to compute a new address for each branch instruction that is encoded with said expression and that is executed by said processing circuitry during said run of said computer program, said new address based on an address identifier included in said each branch instruction.

10. A method for enabling selective execution of sets of code in computer programs, comprising the steps of:

storing a computer program in memory, said computer program having a set of code and a branch instruction, said branch instruction including an address identifier identifying a first address in said memory;

receiving, during a run of said program, run time data indicating whether said set of code is enabled;

setting a value of a mode indicator based on said run time data;

identifying a second address in said memory and in response to said branch instruction;

branching to said second address based on said value of said identifying step and said value of said mode indicator; and executing an instruction at said second address in response to said branching step, wherein said identifying step includes the step of flipping a bit of a bit value representing said first address.

11. A method for enabling selective execution of sets of code in computer programs, comprising the steps of:

storing a computer program in memory, said computer program having a set of code and a branch instruction, said branch instruction encoded with an expression and including an address identifier identifying a first address in said memory;

receiving, during a run of said program, run time data indicating whether said set of code is enabled;

setting a value of a mode indicator based on said run time data;

identifying a second address in said memory and in response to said branch instruction;

branching to said second address based on said value of said identifying step and said value of said mode indicator;

executing an instruction at said second address in response to said branching step; and computing a new address for each branch instruction from said computer program that is encoded with said expression and that is executed during said run of said program, said new address based on an address identifier included in said each branch instruction.

12. The method of claim 11, further comprising the step of maintaining said value of said mode indicator during said run of said computer program and until termination of said run.

* * * * *